United States Patent
Suetake

(10) Patent No.: US 6,880,066 B2
(45) Date of Patent: *Apr. 12, 2005

(54) CENTRAL PROCESSING UNIT AND SYSTEM HAVING A PREFETCH QUEUE AND A COMMAND CACHE TO PERFORM AN EFFICIENT INFORMATION READING OPERATION

(75) Inventor: Seiji Suetake, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/421,008

(22) Filed: Oct. 20, 1999

(65) Prior Publication Data
US 2003/0110365 A1 Jun. 12, 2003

(30) Foreign Application Priority Data
Nov. 13, 1998 (JP) .......................................... 10-324126

(51) Int. Cl.⁷ .............................................. G06F 15/76
(52) U.S. Cl. ..................................................... 712/207
(58) Field of Search .............................. 712/207, 205, 712/206; 710/39, 52, 53, 57

(56) References Cited

U.S. PATENT DOCUMENTS

| | | | |
|---|---|---|---|
| 5,357,618 A | | 10/1994 | Mirza et al. |
| 5,623,615 A | | 4/1997 | Salem et al. |
| 5,649,137 A | * | 7/1997 | Favor et al. ................. 395/383 |
| 5,835,967 A | | 11/1998 | McMahan |
| 5,854,911 A | * | 12/1998 | Watkins ....................... 395/398 |
| 6,195,735 B1 | * | 2/2001 | Krueger et al. ............. 711/204 |
| 6,233,645 B1 | * | 5/2001 | Chrysos et al. ............. 710/244 |

FOREIGN PATENT DOCUMENTS

| | | |
|---|---|---|
| EP | 0790560 A2 | 8/1997 |
| JP | 58060482 A | 4/1983 |
| JP | 1-112429 | 5/1989 |
| JP | 01126733 A | 5/1989 |

* cited by examiner

Primary Examiner—Eddie Chan
Assistant Examiner—Tonia L. Meonske
(74) Attorney, Agent, or Firm—Staas & Halsey LLP

(57) ABSTRACT

A central processing system can maintain an efficient information reading operation even when a program executed by a central processing unit contains many branch commands. A prefetch queue of the central processing unit reads and information expected to be processed next by the central processing unit from a main memory. The function of the prefetch queue is deactivated in accordance with a control signal provided from a prefetch queue control unit. A block transfer function of a cache memory is also deactivated when unnecessary information is read from the main memory in accordance with the block transfer function.

8 Claims, 10 Drawing Sheets

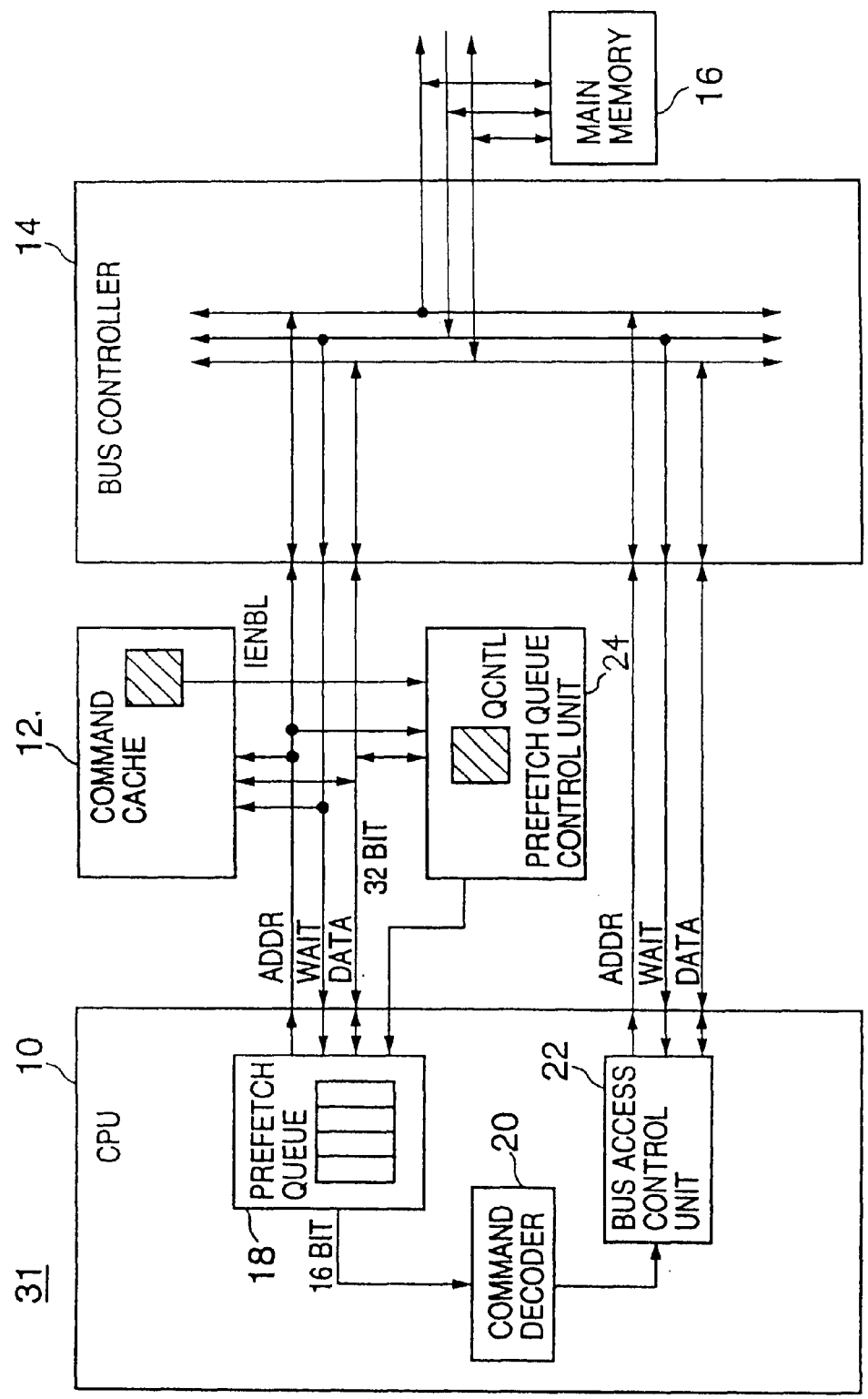

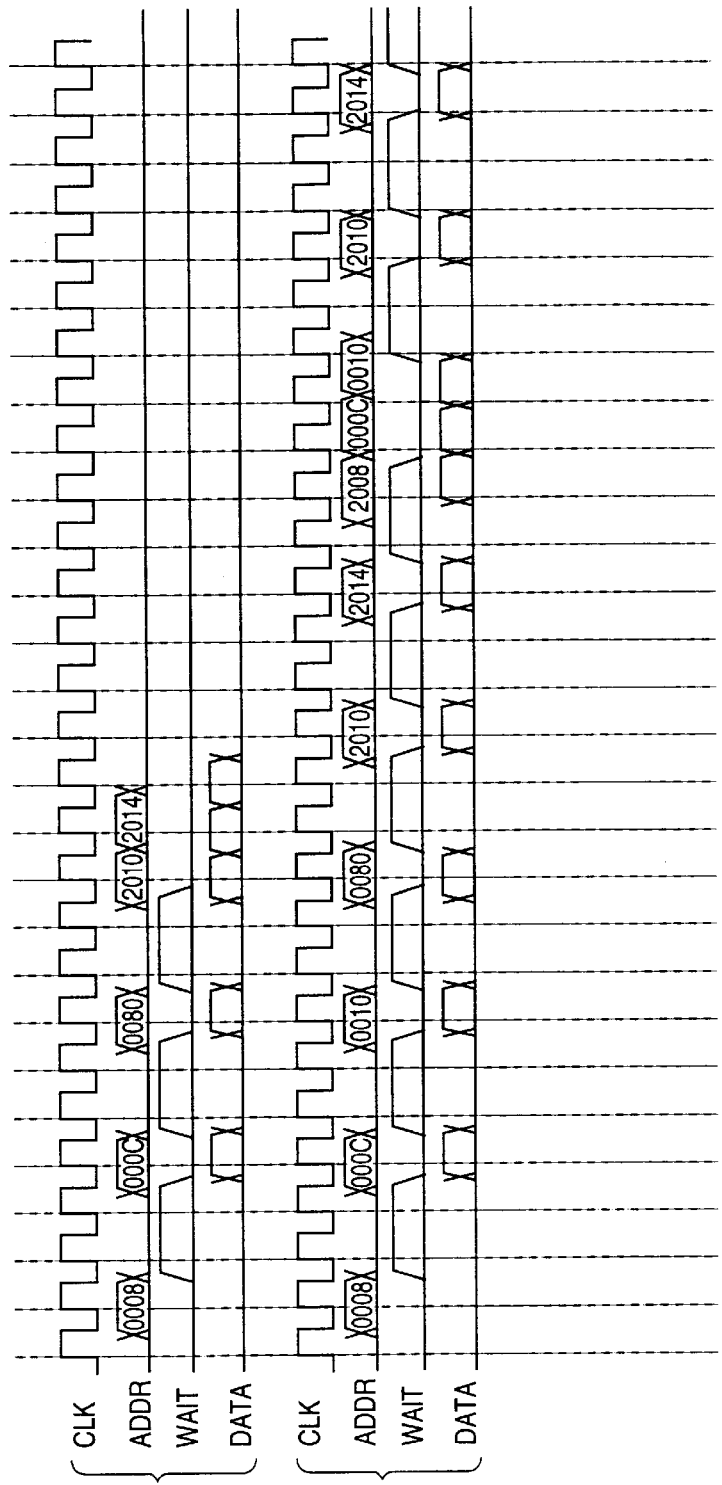

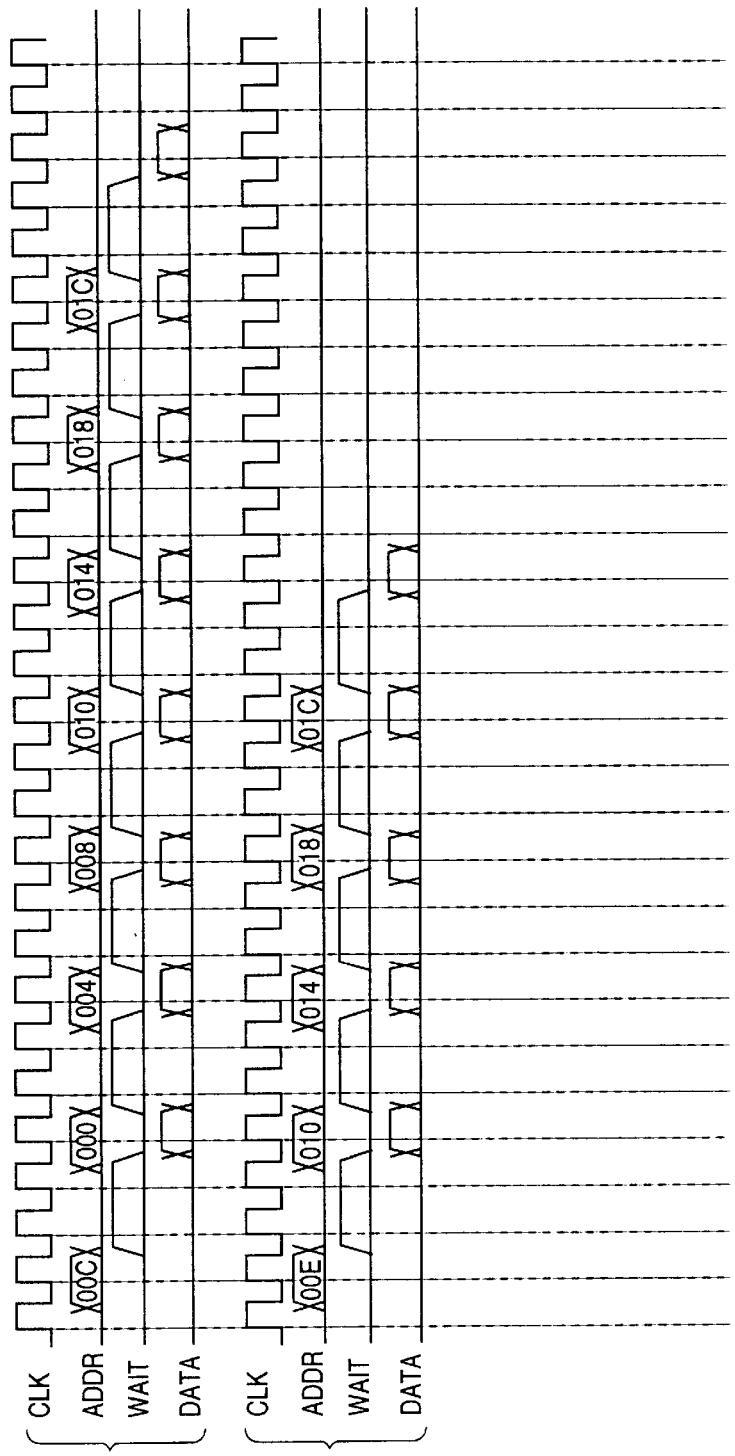

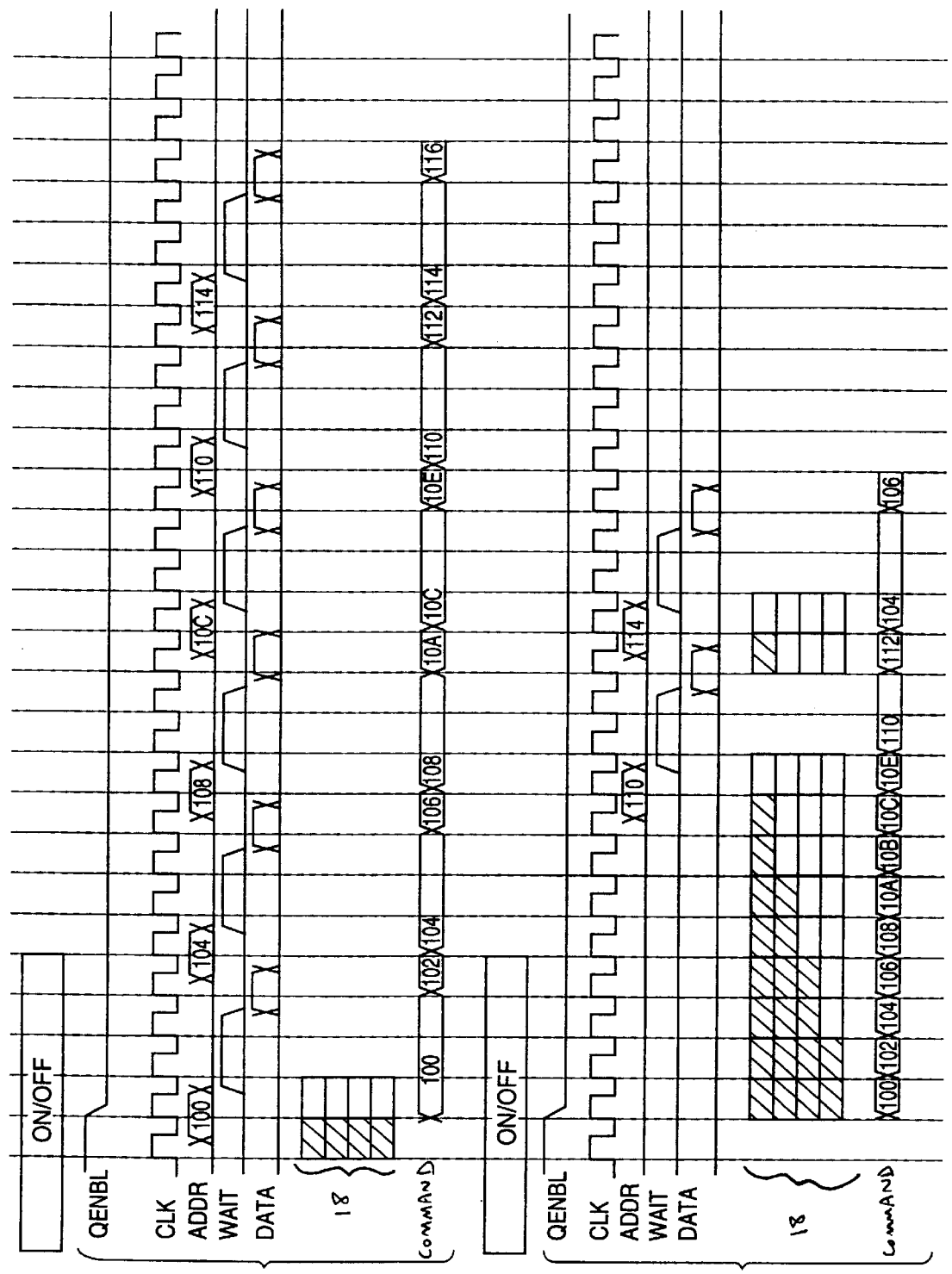

CENTRAL PROCESSING UNIT AND SYSTEM HAVING A PREFETCH QUEUE AND A COMMAND CACHE TO PERFORM AN EFFICIENT INFORMATION READING OPERATION

BACKGROUND OF THE INVENTION

1. Field of the Invention

The present invention generally relates to a central processing unit and system, and, more particularly, to a central processing unit and system having a pre-fetch function.

2. Description of the Related Art

A central processing unit (CPU) reads commands and data from a main memory, and performs controls and operations in accordance with the commands and data. Generally, a processing speed of a CPU is higher than a processing speed of a main memory. Accordingly, a time period for reading commands and data from the main memory greatly influences a processing time of the CPU. In order to reduce the processing time, a high-speed memory device having a small capacity is provided between the CPU and the main memory.

A command cache is used as a high-speed memory having a small capacity. The command cache can store a predetermined number of commands that have been referred to by the CPU. Additionally, there is a prefetch queue which automatically reads a predetermined number of commands corresponding to addresses subsequent to the address of which command is being executed by the CPU.

It is recognized that a CPU tends to refer to information within a limited small range of a memory area during a certain period. In other words, the possibility that pieces of information which are frequently used exist close to each other is high. Accordingly, the above-mentioned command cache and prefetch queue are used for reading such pieces of information stored within a small range in a main memory which small range is expected to be frequently referred to by the CPU.

A description will now be given, with reference to FIG. 1, of an operation of a conventional central processing system in which a high-speed, small-capacity memory device is provided between a CPU and a main memory. FIG. 1 is a block diagram of the conventional central processing system having a pre-fetch function.

As shown in FIG. 1, the central processing system 1 comprises a CPU 10, a command cache 12, a bus controller 14 and a main memory 16. The CPU 10 comprises a prefetch queue 18, a command decoder 20 and a bus access control unit 22.

The prefetch queue 18 automatically reads and stores a command at an address subsequent to an address of which command is being read by the CPU 10. The command cache 12 stores a predetermined number of commands that are previously read from the main memory 16.

A description will now be given, with reference to FIG. 2, of an operation of the prefetch queue 18. FIG. 2 is an illustration for explaining an operation of the prefetch queue 18 in a case in which two commands are automatically read and stored. When the CPU 10 reads a command corresponding to the address "08" and stores the read command in the command decoder 20, the prefetch queue 18 stores a command corresponding to a first subsequent address (or next address) "0A" and a command corresponding to a second subsequent address "0C". Thereafter, when the CPU 10 reads the command corresponding to the address "0A" and stores the read command in the command decoder 20, the prefetch queue 18 stores a command at a second subsequent address "0E" since the command at the first subsequent address is already stored therein.

As mentioned above, the prefetch queue 18 previously reads a command from the command cache 12 or the main memory 16 which command is expected to be executed by the CPU 10 next. Thereby, a time period from the start of reading the command by the CPU 10 until the read command is stored in the command decoder 20 is reduced. The prefetch queue 18 is effective when the execution of commands is straight forward and there are a small number of branch commands included in the series of commands.

A description will now be given, with reference to FIG. 3, of an operation of the command cache. FIG. 3 is an illustration for explaining an operation of the command cache 12. It should be noted that, in the command executed by CPU, the upper 16-bit address "0000" of each address is omitted. Additionally, in the command stored in command cache, each row indicates the upper 16-bit address at the leftmost position, and four lower 8 bit addresses are indicated in the same row. It should be noted that 32-bit data can be stored at each address, and two 16-bit commands are stored at the same address.

When the CPU 10 reads a command corresponding to the address "08", the reading operation changes according to whether or not the command corresponding to the address "08" is stored in the command cache 12. When the command corresponding to the address "08" is stored in the command cache 12, the command corresponding to the address "08" is supplied from the command cache 12 to the prefetch queue 18 of the CPU 10. In the case of FIG. 3, the command corresponding to the address "000008" is read from the command cache 12, and supplied to the prefetch queue 18.

On the other hand, when the command corresponding to the address "08" is not stored in the command cache 12, the command corresponding to the address "08" is read from the main memory 16, and the read command is supplied to the CPU 10. Additionally, the command corresponding to the address "08" is stored in the command cache 12 at an address having the lower 8-bit address "08". In the command cache 12, the arrangement of the lower 8-bit addresses is maintained unchanged. Thus, each address is changed by changing the upper 16-bit address. That is, for example, when the address "000008" is not present in the command cache 12 and instead the address "020008" is present, the upper 16-bit address "0200" corresponding to the lower 8 bit address "08" is changed to "0000", and the command read from the main memory 16 is stored at the changed address "000008".

The above-mentioned operation is performed each time the commands corresponding to the addresses "0A", "0C", "0E", "10" and "12" are read sequentially. In the case of FIG. 3, the command corresponding to the address "12" is a branch command which directs the command routine to return to the command corresponding to the address "08". Since the commands corresponding to the addresses "08", "0A", "0C", "0E", "10" and "12" are already stored in the command cache 12, there is no need to read the commands from the main memory 16. Thus, the time period from the start of reading of the commands by the CPU 10 until the commands are supplied to the command decoder 20 is reduced. The command cache 12 is particularly effective when there are many repetitions in the execution of commands.

As mentioned above, the processing time of the central processing system 1 is reduced by providing the command cache 12 and the prefetch queue 18.

However, if the prefetch queue 18 is provided on the CPU 1 side of the command cache 12 as shown in FIG. 1, the efficiency of operation of the command cache 12 may be deteriorated due to the operation of the prefetch queue 18.

A description will now be given, with reference to FIGS. 4 and 5, of a case in which the efficiency of operation of the command cache 12 is deteriorated by the operation of the prefetch queue 18. FIG. 4 is an illustration for explaining an operation of the prefetch queue 18. FIG. 5 is an illustration for explaining an operation of the command cache 12.

In the operation shown in FIG. 4, after the CPU 10 executes the command corresponding to the address "0C", the CPU 10 executes the command corresponding to the address "08" since the command corresponding to the address "0C" is a branch command directing the routine to proceed to the address "08". However, while the CPU 10 executes the command corresponding to the address "0C", the prefetch queue 18 reads from the command cache 12 or the main memory 16 the address corresponding to the first subsequent address and the command corresponding to the second subsequent address, and the thus-read commands are stored in the prefetch queue 18. As a result, the prefetch queue 18 stores the commands which will not be executed by the CPU 10.

When the prefetch queue 18 reads and stores the command which will not be executed by the CPU 10, the command is also stored in the command cache 12 since the command cache 12 does not have a function to determine whether a command to be stored therein is actually used by the CPU 10.

In the case of FIG. 5, while the CPU 10 executes the command corresponding to the address "0C", the command corresponding to the address "0E" and the command corresponding to the address "10" are supplied to the prefetch queue 18 and also stored in the command cache 12. In the command cache 12, the upper 16-bit address corresponding to the address "10" is "0200" as shown in FIG. 5. Accordingly, in order to store the command corresponding to the address "10" in the command cache 12, the upper 16-bit address "0200" is changed to "0000". Thus, the commands corresponding to other three addresses "14", "18" and "1C" that are presently stored in the command cache 12 are deleted. In such a case, since the commands corresponding to the address "0E" and "10" are skipped and not executed by the CPU 10, the deleted commands corresponding to the addresses "14", "18" and "1C" are unnecessarily deleted due to the unnecessary storage of the commands corresponding to the address "10". If the deleted commands corresponding to the addresses "14", "18" and "1C" are frequently used commands, the efficiency of the command reading operation is deteriorated.

A description will now be given, with reference to FIG. 6, of a case in which the efficiency of the operation of the command cache 12 deteriorates due to a block transfer function. FIG. 6 is an illustration for explaining an operation of the command cache 12. According to the block transfer function, the information stored in the command cache 12 is rewritten on an individual block basis. It should be noted that a single block is defined by four words in the same row, for example, the addresses "00", "04", "08" and "0C" as shown in FIG. 6.

When the CPU 10 reads the command corresponding to the address "1E", the CPU 10 determines whether or not the command corresponding to the address "1E" is stored in the command cache 12. In the case of FIG. 6, the upper 16-bit address "0200" is provided to the lower 8-bit addresses "10" to "1C". Accordingly, the commands corresponding to the addresses having the upper 16-bit address "0000" must be read from the main memory 16.

According to the block transfer function, the command cache 12 automatically write the addresses "000010" to "00001F". However, a next command cannot be read until the block transfer operation is completed. In this case, the commands corresponding to the addresses "000010 to 00001A" are not executed. Accordingly, the CPU 10 cannot read the command corresponding to the next address "000020" until the writing operation for the commands corresponding to the addresses "000010 to 00001A" is completed in the command cache 12. Thus, the efficiency of operation for reading commands from the command cache 12 deteriorates.

As mentioned above, there is a problem in that there are some cases in which the command cache 12 and the prefetch queue 18 cannot be efficiently operated in combination.

SUMMARY OF THE INVENTION

It is a general object of the present invention to provide an improved and useful central processing unit and system in which the above-mentioned problems are eliminated.

A more specific object of the present invention is to provide a central processing unit and system which can maintain an efficient information reading operation even when a program executed by the central processing unit contains many branch commands.

Another object of the present invention is to provide a central processing system in which an efficient information reading operation can be maintained even when both a cache memory and a prefetch queue are provided in the system.

In order to achieve the above-mentioned objects, there is provided according to one aspect of the present invention a central processing unit for processing information read from a memory, the central processing unit comprising:

a prefetch queue which reads and stores information expected to be processed next by the central processing unit; and a control circuit controlling status of the prefetch queue in accordance with a control signal provided from an external device.

According to this invention, the prefetch queue can be activated or deactivated by the control signal in accordance with a program executed by the central processing unit. If the program contains many branch commands, the prefetch queue can be deactivated by the control signal so that the function of the prefetch queue does not deteriorate an effective reading operation by the central processing unit. Thus, an efficient information reading operation can be maintained.

Additionally, there is provided according to another aspect of the present invention a central processing system comprising:

a central processing unit having a prefetch queue which reads and stores information expected to be processed next by the central processing unit;

a main memory storing information to be processed by the central processing unit;

a cache memory storing the information previously read from the main memory by the central processing unit; and a prefetch queue control unit controlling an operation of the prefetch queue.

According to this invention, the prefetch queue can be activated or deactivated by the prefetch queue control unit in accordance with a program executed by the central processing unit. If the program contains many branch commands, the prefetch queue can be deactivated by a control signal supplied by the prefetch queue control unit so that the function of the prefetch queue does not deteriorate an effective reading operation by the central processing unit. Thus, an efficient information reading operation can be maintained.

Additionally, in the central processing system according to the present invention, the cache memory may have a block transfer function to store the information read from the main memory on an individual block basis, each block including information corresponding to a plurality of addresses in the main memory, and wherein the block transfer function is deactivated when the information corresponding to the block to be read from the main memory includes information which is unexpected to be processed by the central processing unit.

According to this invention, the cache memory is prevented from storing unnecessary information due to the block transfer function in which information corresponding to a plurality of addresses is read from the main memory at once.

Other objects, features and advantages of the present invention will become more apparent from the following detailed description when read in conjunction with the accompanying drawings.

BRIEF DESCRIPTION OF THE DRAWINGS

FIG. 7 is a block diagram of a central processing system according to a first embodiment of the present invention;

FIG. 9A is a timing chart of an address reading operation when the prefetch queue is in the OFF state;

FIG. 9B is a timing chart of an address reading operation when the prefetch queue is in the ON state;

FIG. 10A is a timing chart of an address reading operation when a command cache is in the ON state;

FIG. 10B is a timing chart of an address reading operation when the command cache is in the OFF state;

FIG. 11A is a timing chart of an address reading operation in which the commands already stored in the prefetch queue are discarded when the prefetch queue is changed from the ON state to the OFF state; and FIG. 11B is a timing chart of an address reading operation performed by the central processing system shown in FIG. 7.

DETAILED DESCRIPTION OF THE PREFERRED EMBODIMENT

A description will now be given of a central processing system according to a first embodiment of the present invention.

Figure 1:
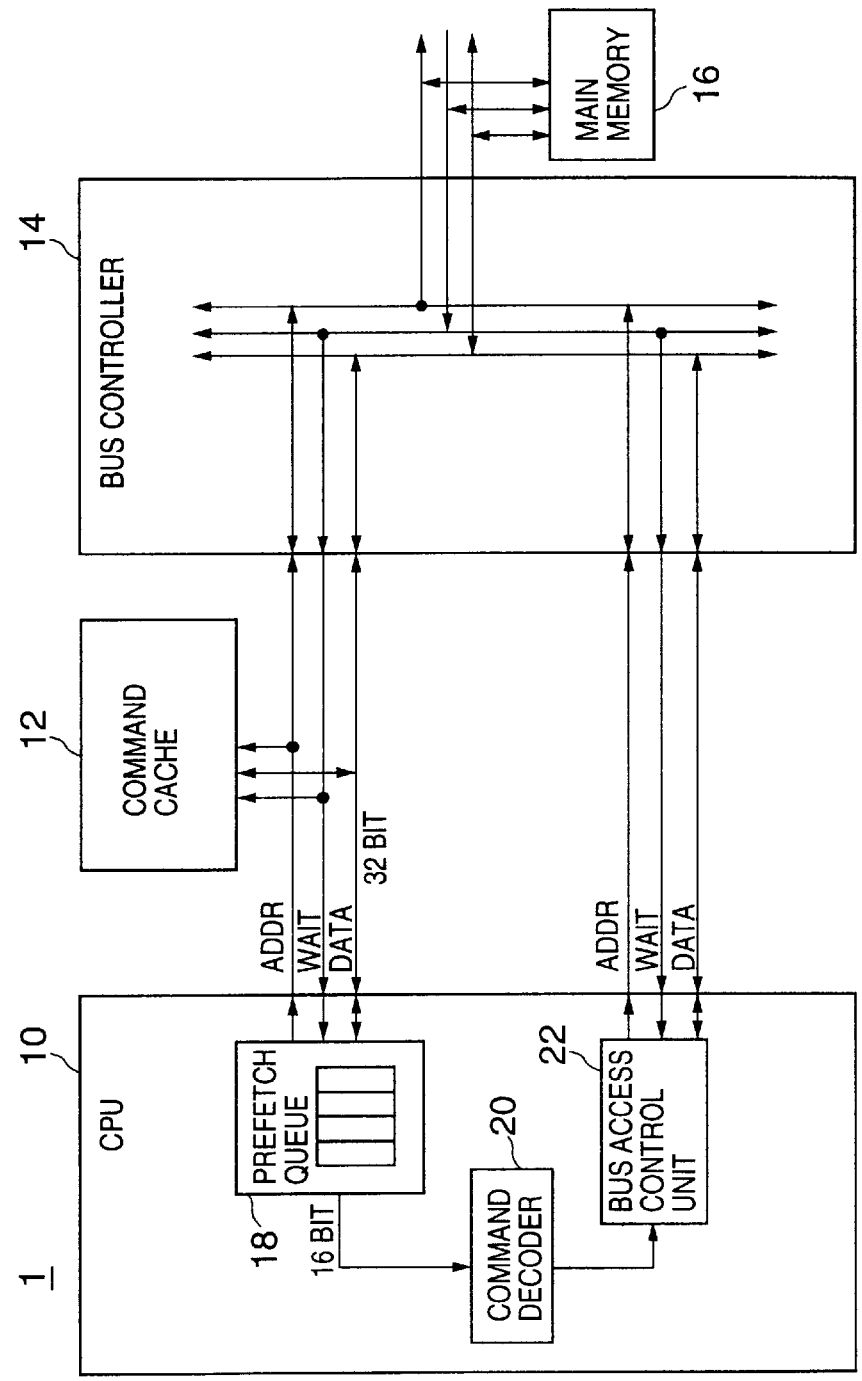
FIG. 1 is a block diagram of a conventional central processing system having a pre-fetch function.

FIG. 7 is a block diagram of a central processing system according to the first embodiment of the present invention. In FIG. 7, parts that are the same as the parts shown in FIG. 1 are given the same reference numerals, and descriptions thereof will be omitted.

The central processing system 31 shown in FIG. 7 comprises a CPU 10, a command cache 12, a bus controller 14, a main memory 16 and a prefetch queue control unit 24. The CPU 10 comprises a prefetch queue 18, a command decoder 20 and a bus access control unit 22.

Figure 2:
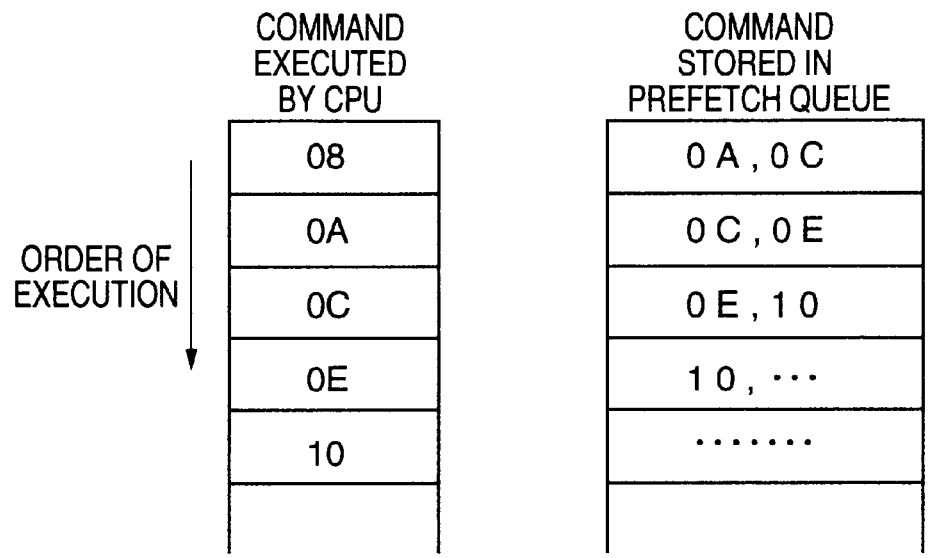
FIG. 2 is an illustration for explaining an operation of a prefetch queue shown in FIG. 1 in a case in which two commands are automatically read and stored.
Figure 3:
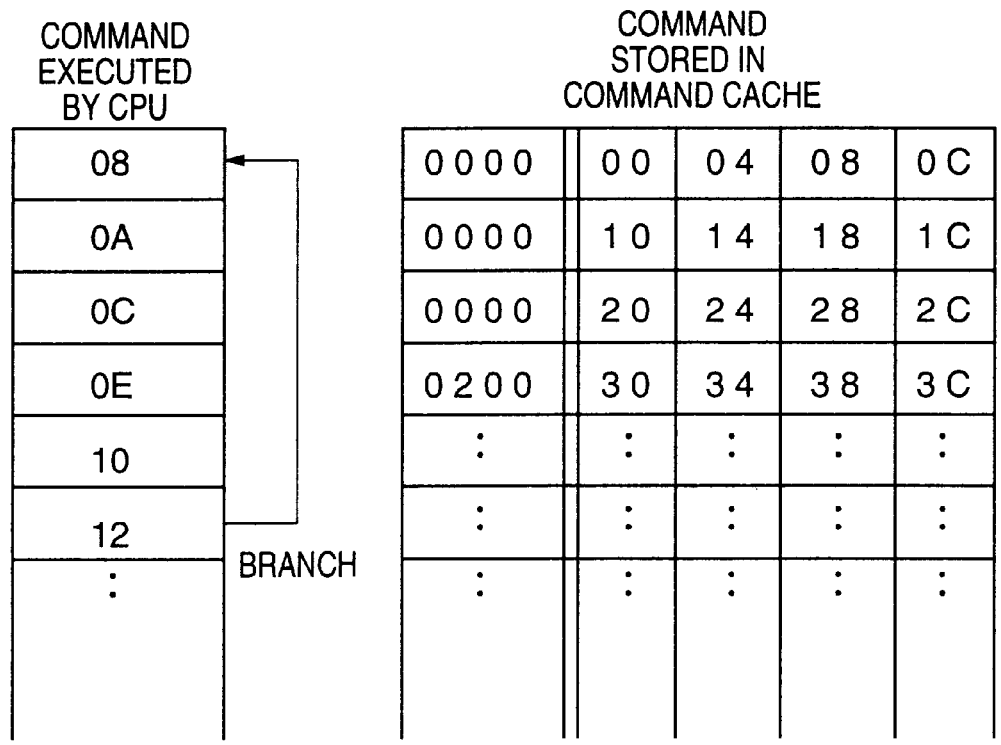
FIG. 3 is an illustration for explaining an operation of a command cache shown in FIG. 1.
Figure 4:
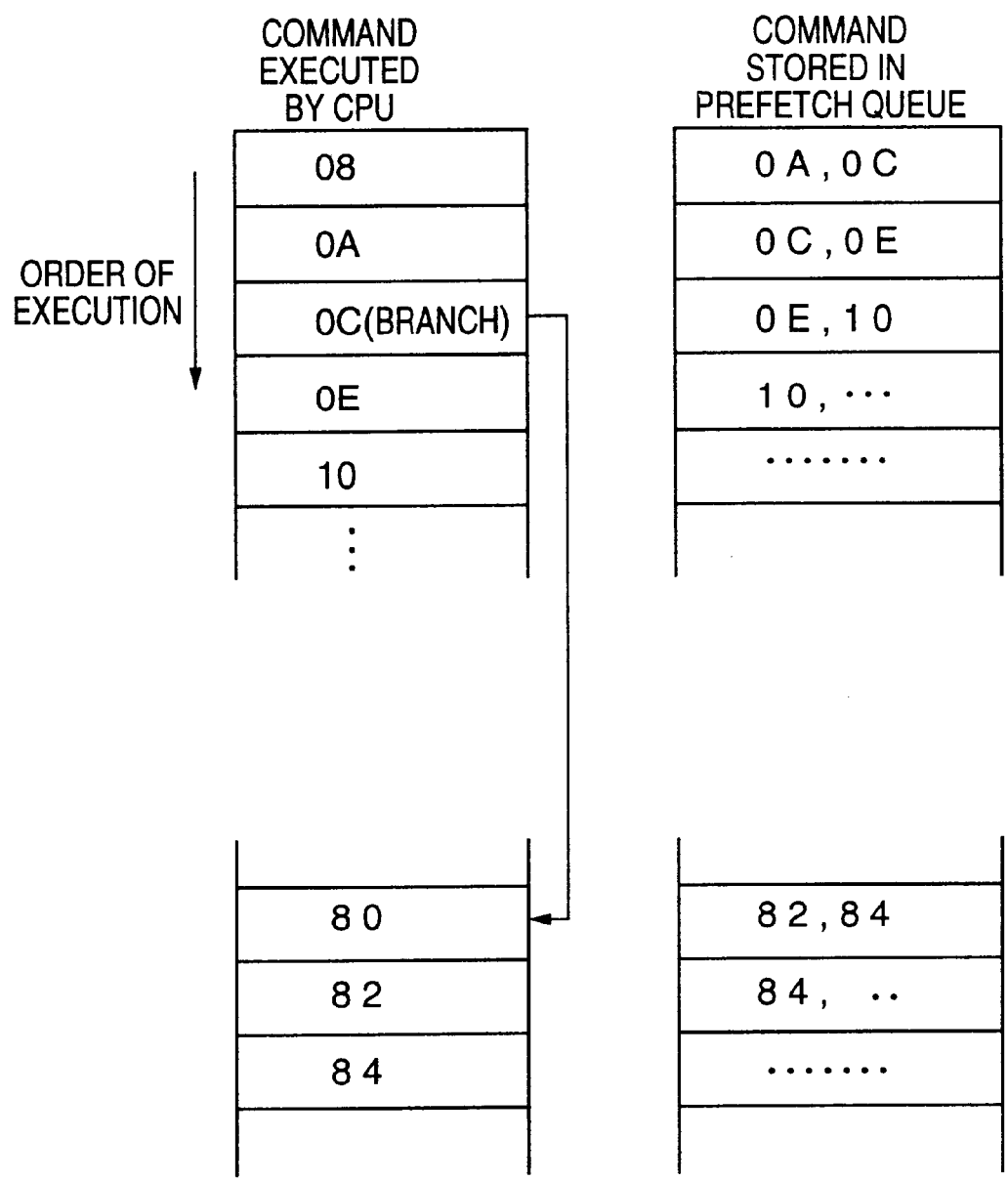
FIG. 4 is an illustration for explaining an operation of the prefetch queue shown in FIG. 1.
Figure 5:
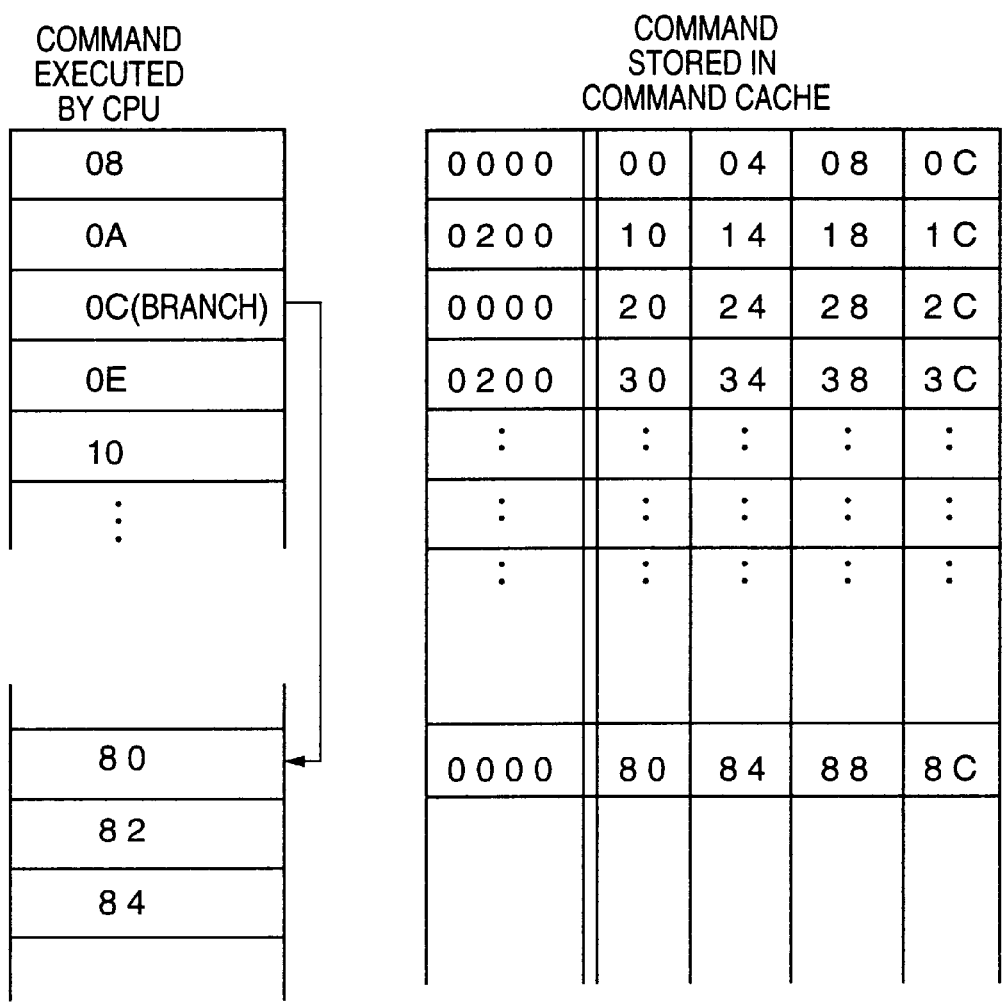
FIG. 5 is an illustration for explaining an operation of the command cache shown in FIG. 1.
Figure 6:
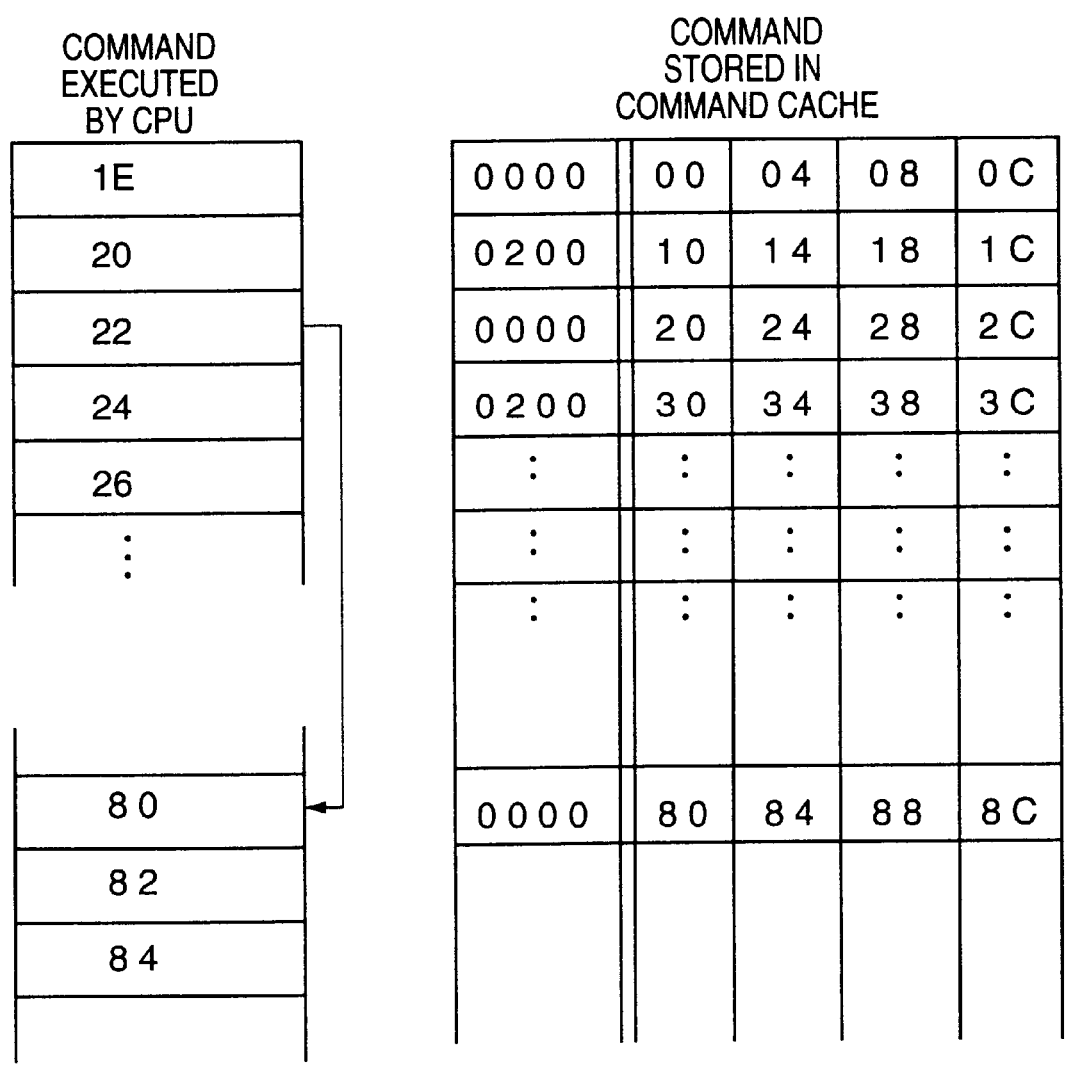
FIG. 6 is an illustration for explaining an operation of the command cache shown in FIG. 1.

The prefetch queue 18 automatically reads and stores a command corresponding to an address subsequent to an address at which a command currently being processed by the CPU 10 is stored. Additionally, the command cache 12 stores a predetermined number of commands previously read from the main memory 16. It should be noted that the basic operations of the prefetch queue 18 and the command cache 12 are the same as that described with reference to FIGS. 2 and 3, and descriptions thereof will be omitted.

In the present embodiment, the prefetch queue 18 is controlled by the prefetch queue control unit 24. That is, the prefetch queue 18 is controlled by writing a predetermined value in a QCNTL register provided in the prefetch queue control unit 24. For example, when the value in the QCNTL register is "00", the pre-fetch function is turned OFF regardless of the ON/OFF status of the command cache 12; when the value in the QCNTL register is "01", the pre-fetch function is turned ON regardless of the ON/OFF status of the command cache 12; when the value of the QCNTL register is "10", the status of the command cache 12 is changed from an ON state to an OFF state or from the OFF state to the ON state; when the value of the QCNTL is "11", the ON/OFF state of the prefetch queue 18 is rendered to be the same as the ON/OFF state of the command cache 12.

The prefetch queue control unit 24 discriminates the ON/OFF state of the command cache 12 in accordance with an IENBL signal (instruction cache enable) being input thereto. The IENBL signal indicates the current ON/OFF state of the command cache 12. The prefetch queue control unit 24 supplies a QENBL signal to the prefetch queue 18 in accordance with the value of the QCNTL register and the IENBL signal provided by the command cache 12 so that the ON/OFF state of the prefetch queue 18 is controlled by the QENBL signal.

The above-mentioned operation can be achieved by outputting from the bus access control unit 22 of the CPU 10 to the data bus the address and the value to be written in the QCNTL register when a last ST command is executed so that the value is written in the QCNTL register via the bus controller 14.

Figures 8A, 8B:
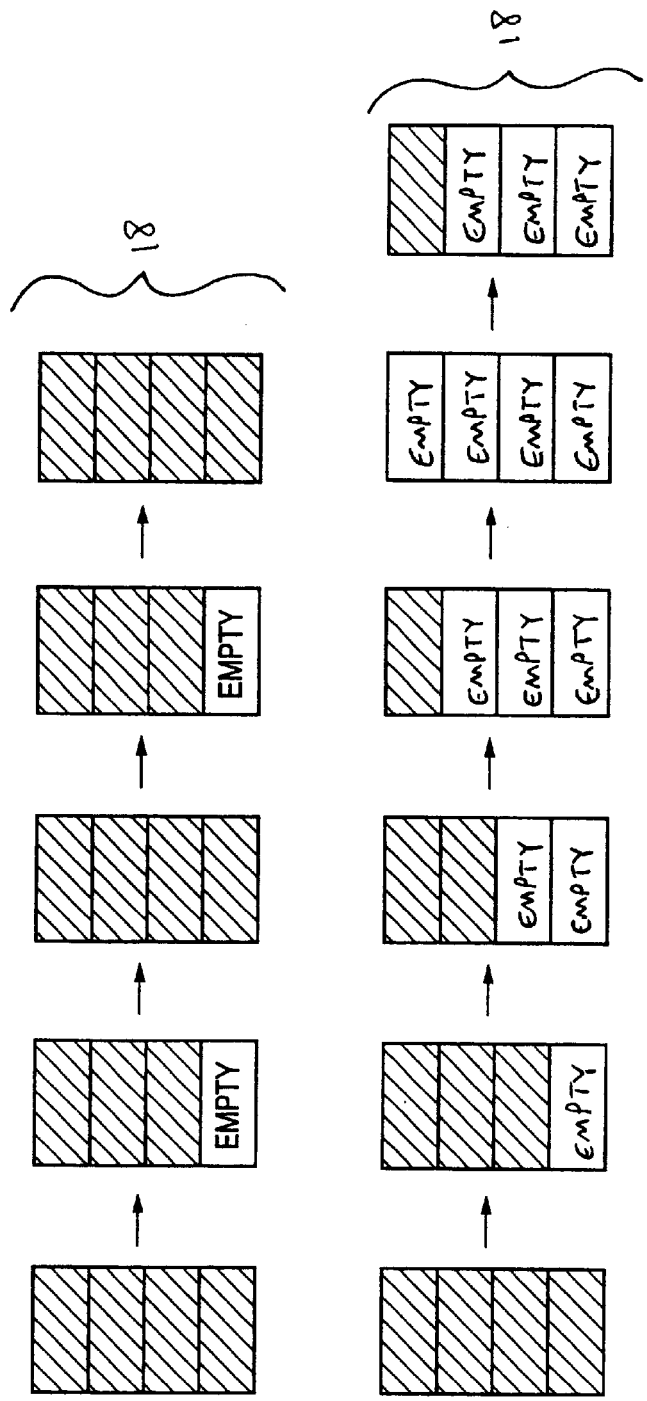
FIG. 8A is an illustration for explaining contents of a prefetch queue when the prefetch queue is in an ON state.
FIG. 8B is an illustration of explaining contents of the prefetch queue when the prefetch queue is in an OFF state.

When the status of the prefetch queue 18 is changed from the ON state to the OFF state, an operation shown in FIG. 8A or 8B is performed in order to effectively use the commands which are already stored in the prefetch queue 18. FIG. 8A shows an operation when the prefetch queue 18 is in the ON state. FIG. 8B shows an operation when the prefetch queue 18 is in the OFF state.

When the prefetch queue 18 is in the ON state, as shown in FIG. 8A, a command corresponding to the next address (illustrated by a box with diagonal lines) is read and stored in the prefetch queue 18 immediately after an empty area is generated in the prefetch queue 18. On the other hand, when the status of the prefetch queue 18 is changed from the ON state to the OFF state, the commands already stored in the prefetch queue 18 (illustrated by a box with diagonal lines) are sequentially read until the prefetch queue 18 becomes empty as shown in FIG. 8B. Thereafter, a command corresponding to a single new address is stored each time the stored command is read.

As mentioned above, when the status of the prefetch queue 18 is changed from the ON state to the OFF state, a command corresponding to a new address is read after all of the commands stored in the prefetch queue 18 are read. Accordingly, the commands already stored in the prefetch queue 18 are effectively used without being discarded. As a result, the efficiency of operation of the prefetch queue 18 does not deteriorate.

A description will now be given, with reference to FIGS. 9A and 9B, of a case in which an improved efficiency is obtained when the prefetch queue 18 is in the OFF state and the command cache 12 is in the ON state. FIG. 9A is a timing chart of a command reading operation when the prefetch queue 18 is in the OFF state. FIG. 9B is a timing chart of a command reading operation when the prefetch queue 18 is in the ON state.

When the prefetch queue 18 is in the OFF state, the CPU 10 reads the commands to be executed from the command cache 12 or the main memory 16. At this time, if a command to be executed is not stored in the command cache 12, a waiting time is provided so as to read the command from the main memory 16.

In the case of FIG. 9A, the commands corresponding to the addresses "0008", "000C" and "0080" are not present in the command cache 12, and the commands are read from the main memory 16. Accordingly, a waiting time is provided for reading the commands corresponding to the designated addresses. On the other hand, the commands corresponding to the addresses "2010" and "2014" are present in the command cache 12, and the commands are read from the command cache 12. Accordingly, the waiting time for reading the commands from the main memory 16 is not provided.

When the prefetch queue 18 is in the ON state, the prefetch queue 18 stores a command corresponding to an address subsequent to the address of which command is being executed. That is, as shown in FIG. 9B, when the command corresponding to the address "0008" is executed by the CPU 10, the prefetch queue 18 reads the command corresponding to the address "000C" subsequent to the address of which command is being executed. Accordingly, a waiting time is provided so as to read the command from the main memory 16.

Thereafter, when the command corresponding to the address "000C" is executed by the CPU 10, the prefetch queue 18 reads the command corresponding to the subsequent address "0010" from the main memory 16, and stores the read command therein. Accordingly, a waiting time is provided so as to read the command from the main memory 16.

If the command corresponding to the address "000C" is a branch command which indicates that the command corresponding to the address "0080" is to be executed next, the command corresponding to the address "0010" is not executed and the command corresponding to the address "0080" is read from the main memory 16. Accordingly, a waiting time is provided so as to read the command from the main memory 16.

Thereafter, the command corresponding to the address "2010" is executed by the CPU 10. Although the command corresponding to the address "2010" had been stored in the command cache 12, the command was deleted due to the storage of the command corresponding to the address "0010". Accordingly, as shown in FIG. 9B, a waiting time is provided so as to read the command from the main memory 16.

In this case, if the prefetch queue 18 is in the OFF state, the command corresponding to the address "2010" is not deleted from the command cache 12, and, thereby, the unnecessary waiting time is not provided. Accordingly, in the above-mentioned case, an improved efficiency can be obtained when the prefetch queue 18 is in the OFF state and the command cache 12 is in the ON state.

A description will now be given, with reference to FIGS. 10A and 10B, of a case in which the efficiency of the command reading operation by the CPU 10 is increased when the command cache 12 is in the OFF state, that is, when the block transfer function of the command cache 12 is deactivated. FIG. 10A is a timing chart of a command reading operation when the command cache 12 is in the ON state. FIG. 10B is a timing chart of a command reading operation when the command cache 12 is in the OFF state.

When the command cache 12 is in the ON state, that is, when the block transfer function of the command cache is activated, the CPU 10 reads the command to be executed by the CPU 10 from the command cache 12 or the main memory 16. If the address to be read is not present in the command cache 12, a waiting time is provided so as to read the command from the main memory 16. When the block transfer function is activated and when the address to be read is not present in the command cache 12, the designated command is read from the main memory on an individual block basis.

Specifically, as shown in FIG. 10A, when the command corresponding to the address "00C" to be executed by the CPU 10 is read from the main memory 16 and the read command is stored in the command cache 12, the commands corresponding to the addresses "000", "004" and "008" are sequentially read after reading the command corresponding to the address "00C" and the read commands are stored in the command cache 12 since the commands corresponding to the addresses "000", "004", "008" and "00C" are included in the same block. Accordingly, the command corresponding to the next address "010" cannot be read until the storage of the unnecessary commands corresponding to the addresses "000", "004" and "008" is completed. Accordingly an unnecessary waiting time is provided.

On the other hand, when the command cache 12 is in the OFF state, that is, when the block transfer function is deactivated, the CPU 10 reads the commands to be executed from the command cache 12 or the main memory 16. If the command to be read is not present in the command cache 12, a waiting time is provided so as to read the address from the main memory 16. However, since the block transfer function is deactivated, only the necessary command is read from the main memory 16.

Specifically, as shown in FIG. 10B, the commands to be executed by the CPU 10 are sequentially read from the main memory 16, and the read commands are directly supplied to the CPU 10 for execution, the waiting time for reading unnecessary commands is not provided. As a result, an efficient command reading operation can be achieved.

A description will now be given, with reference to FIGS. 11A and 11B, of an address reading operation when the status of the prefetch queue 18 is changed from the ON state to the OFF state. FIG. 11A is a timing chart of an address reading operation in which the commands already stored in the prefetch queue 18 are discarded when the prefetch queue 18 is changed from the ON state to the OFF state. FIG. 11B is a timing chart of an address reading operation in the present embodiment.

When the QENBL signal supplied by the prefetch queue control unit 24 changes from a high level to a low level, and when the status of the prefetch queue 18 is changed from the ON state to the OFF state, as shown in FIG. 11A, the commands corresponding to the addresses "100" to "10E" (illustrated by a box with diagonal lines), which commands are stored in the prefetch queue 18, are discarded so as that the prefetch queue 18 becomes empty. Thereafter, the commands corresponding to the addresses "100" to "10E" are sequentially read from the main memory 16. Thus, an unnecessary waiting time is provided which results in deterioration of the efficiency of the address reading operation.

On the other hand, in the address reading operation according to the present embodiment as shown in FIG. 11B, the commands corresponding to the addresses "100" to "10E" (illustrated by a box with diagonal lines) which commands are stored in the prefetch queue 18 are sequentially read from the prefetch queue 18 even when the status of the prefetch queue 18 is changed to the OFF state. Thereafter, when the prefetch queue 18 becomes empty, a command corresponding to a new address is stored in the prefetch queue 18 and the thus-stored command is read. Accordingly, the commands already stored in the prefetch queue 18 are not discarded when the status of the prefetch queue 18 is changed to the OFF state. As a result, the efficiency of the address reading operation is not decreased due to the discarding of the previously stored commands.

It should be noted that, in FIGS. 11A and 11B, the prefetch queue 18 has a structure having four stages each of which stores 32-bit data so that two 16-bit commands can be stored in each stage.

It should be noted that the change over of the status of the prefetch queue 18 and the command cache 12 can be achieved either by means of hardware or software. Additionally, a command for changing the status of the prefetch queue 18 and the command cache 12 may be provided in a program.

The present invention is not limited to the specifically disclosed embodiments, and variations and modifications may be made without departing from the scope of the present invention.

The present application is based on Japanese priority application No.10-324126 filed on Nov. 13, 1998, the entire contents of which are hereby incorporated by reference.

What is claimed is:

1. A central processing unit for executing instructions read from a memory, said central processing unit comprising:
a prefetch queue, which reads and stores instructions expected to be executed next by said central processing unit, and which is set in one of an activated state and a deactivated state in accordance with a control signal provided from an external unit,
wherein the prefetch queue reads in advance an instruction corresponding to an address subsequent to an address of an instruction already read by the central processing unit when the prefetch queue is set in the activated state, and the central processing unit stops using the prefetch queue and fetches the instruction already read by the prefetch queue when the prefetch queue is set in the deactivated state, and
wherein when the status of the prefetch queue is changed from the activated state to the deactivated state, the prefetch queue outputs the instructions already stored in the prefetch queue so that the instructions already stored in the prefetch queue are executed without being discarded.

2. The central processing unit as claimed in claim 1, wherein said prefetch queue reads the instruction expected to be executed next from said memory in accordance with address information corresponding to the instruction already stored in said prefetch queue.

3. A central processing system comprising:
a central processing unit having a prefetch queue, which reads and stores instructions expected to be executed next by said central processing unit, and which is set in one of an activated state and a deactivated state in accordance with a control signal provided from an external device;
a main memory storing the instructions to be executed by said central processing unit; and
a cache memory storing the instructions previously read from said main memory by said central processing unit,
wherein the prefetch queue reads in advance an instruction corresponding to an address subsequent to an address of an instruction already read by the central processing unit when the prefetch queue is set in the activated state, and the central processing unit stops using the prefetch queue and fetches the instruction already read by the prefetch queue when the prefetch queue is set in the deactivated state, and
wherein when the status of the prefetch queue is changed from the activated state to the deactivated state, the prefetch queue outputs instructions already stored in the prefetch queue so that the instructions already stored in the prefetch queue are executed without being discarded.

4. The central processing system as claimed in claim 3, wherein said prefetch queue reads the instruction expected to be executed next from said main memory in accordance with address information corresponding to the instruction already stored in said prefetch queue.

5. The central processing system as claimed in claim 3, wherein said cache memory has a block transfer function to store the instructions read from said main memory on an individual block basis, each block including information corresponding to a plurality of addresses in said main memory, and wherein said block transfer function is deactivated when the information corresponding to the block to be read from said main memory includes instructions which are not expected to be executed by said central processing unit.

6. The central processing system as claimed in claim 5, wherein each of a prefetch function of said prefetch queue and said block transfer function of said cache memory is deactivated in accordance with a process performed by said central processing unit.

7. The central processing system as claimed in claim 3, further comprising:
a prefetch queue control unit that comprises a register having data indicating whether a state of the prefetch queue is activated, wherein the control data-signal is generated in accordance with the data.

8. A central processing unit for executing instructions read from a memory, the central processing unit comprising:

a prefetch queue that reads and stores instructions that are expected to be executed by the central processing unit when the prefetch queue is in an activated state, wherein the prefetch queue is not used when the prefetch queue is in a deactivated state, and wherein the prefetch queue is set in the activated state or the deactivated state in accordance with a control signal provided from an external unit; and a command decoder that decodes instructions received from the prefetch queue, wherein when the status of the prefetch queue is changed from the activated state to the deactivated state, the prefetch queue outputs all instructions already stored in the prefetch queue to the command decoder, so that the instructions already stored in the prefetch queue are executed without being discarded.

* * * * *

UNITED STATES PATENT AND TRADEMARK OFFICE
CERTIFICATE OF CORRECTION

PATENT NO.    : 6,880,066 B2
DATED         : April 12, 2005
INVENTOR(S)   : Seiji Suetake It is certified that error appears in the above-identified patent and that said Letters Patent is hereby corrected as shown below:

Column 11,
Line 1, delete "data-".

Signed and Sealed this

Seventh Day of March, 2006

JON W. DUDAS
*Director of the United States Patent and Trademark Office*